(12) United States Patent
Penzo et al.

(10) Patent No.: US 9,458,259 B2
(45) Date of Patent: Oct. 4, 2016

(54) PROCESS FOR TREATING POLYOLEFIN PARTICLES OBTAINED BY GAS-PHASE POLYMERIZATION

(71) Applicant: Basell Polyolefine GmbH, Wesseling (DE)

(72) Inventors: Giuseppe Penzo, Ferrara (IT); Giulia Mei, Ferrara (IT); Gabriele Mei, Ferrara (IT); Antonio De Lucia, Amsterdam (NL); Pietro Baita, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 14/650,532

(22) PCT Filed: Dec. 11, 2013

(86) PCT No.: PCT/EP2013/076189
§ 371 (c)(1),
(2) Date: Jun. 8, 2015

(87) PCT Pub. No.: WO2014/090860
PCT Pub. Date: Jun. 19, 2014

(65) Prior Publication Data
US 2015/0322178 A1    Nov. 12, 2015

(30) Foreign Application Priority Data

Dec. 11, 2012 (EP) .................... 12196451

(51) Int. Cl.
| C08G 63/02 | (2006.01) |
| C08F 10/02 | (2006.01) |
| C08F 6/00 | (2006.01) |
| C08F 6/02 | (2006.01) |
| B29B 13/00 | (2006.01) |

(52) U.S. Cl.
CPC ............. *C08F 10/02* (2013.01); *C08F 6/005* (2013.01); *C08F 6/02* (2013.01); *B29B 2013/005* (2013.01)

(58) Field of Classification Search
CPC .................................. C08F 6/02; C08F 6/005
USPC ................................................ 528/483, 480
See application file for complete search history.

(56) References Cited

U.S. PATENT DOCUMENTS

| 5,789,501 A | 8/1998 | Chapman et al. |
| 5,799,412 A | 9/1998 | Yamamoto et al. |
| 7,786,254 B2 * | 8/2010 | Baita .................. B01J 8/003 528/483 |
| 8,314,197 B2 | 11/2012 | Chamayou et al. |
| 9,358,515 B2 | 6/2016 | Hottovy et al. |
| 2010/0004408 A1 | 1/2010 | Baita et al. |

FOREIGN PATENT DOCUMENTS

| EP | 683176 A1 | 11/1995 |
| RU | 2456300 C2 | 7/2012 |
| WO | WO 2008/015228 A2 | 2/2008 |
| WO | WO-2010037656 A1 | 4/2010 |
| WO | WO-2011097119 A1 | 8/2011 |

OTHER PUBLICATIONS

PCT International Search Report & Written Opinion mailed Apr. 2, 2014, for PCT/EP2013/076189.

* cited by examiner

*Primary Examiner* — Terressa Boykin

(57) ABSTRACT

Process for treating polyolefin particles obtained by gas-phase polymerization of one or more olefins in the presence of a polymerization catalyst system and a $C_3$-$C_5$ alkane as polymerization diluent in a gas-phase polymerization reactor, the process comprising the steps of a) discharging the polyolefin particles continuously or discontinuously from the gas-phase polymerization reactor and transferring the particles to a first degassing vessel;

b) contacting therein the polyolefin particles with a gaseous stream comprising at least 85 mol-% of $C_3$-$C_5$ alkane while the polyolefin particles have an average residence time in the first degassing vessel of from 5 minutes to 5 hours;

c) transferring the polyolefin particles to a second degassing vessel;

d) contacting therein the polyolefin particles with a stream comprising nitrogen and steam while the polyolefin particles have an average residence time in the second degassing vessel of from 5 minutes to 2 hours, wherein the contacting is carried out at conditions under which no condensation of water occurs;

e) transferring the polyolefin particles to a third degassing vessel;

f) contacting therein the polyolefin particles with a stream of nitrogen while the polyolefin particles have an average residence time in the third degassing vessel of from 5 minutes to 8 hours, and processes for preparing polyolefin polymers by gas-phase polymerization of one or more olefins in the presence of a polymerization catalyst system and a $C_3$-$C_5$ alkane as polymerization diluent in a gas-phase polymerization reactor, wherein the obtained polyolefin particles are subjected to such a treating process.

10 Claims, 1 Drawing Sheet

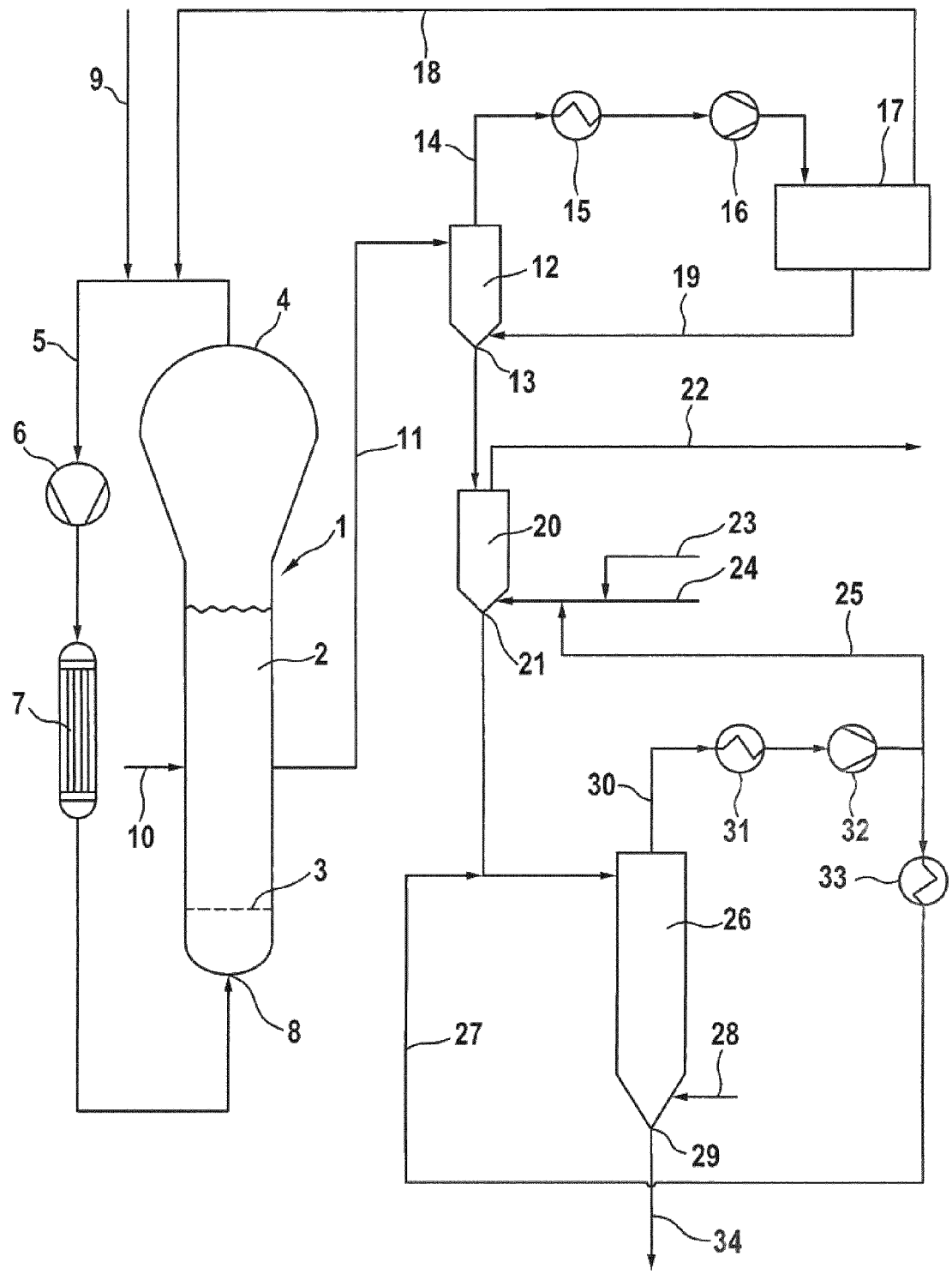

PROCESS FOR TREATING POLYOLEFIN PARTICLES OBTAINED BY GAS-PHASE POLYMERIZATION

This application is the U.S. National Phase of PCT International Application PCT/EP2013/076189, filed Dec. 11, 2013, claiming benefit of priority to European Patent Application No. 12196451.4, filed Dec. 11, 2012, the contents of which are incorporated herein by reference in their entirety.

FIELD OF THE INVENTION

The present invention relates to a process for treating polyolefin particles obtained by gas-phase polymerization of one or more olefins in the presence of a polymerization catalyst system and a $C_3$-$C_5$ alkane as polymerization diluent in a gas-phase polymerization reactor.

BACKGROUND OF THE INVENTION

Gas-phase polymerization processes are economical processes for the polymerization of olefins such as homopolymerizing ethylene or propylene or copolymerizing ethylene or propylene with other olefins. Suitable reactors for carrying out such gas-phase polymerizations are for example fluidized-bed reactors, stirred gas-phase reactors or multizone circulating reactors with two distinct interconnected gas-phase polymerization zones. These processes are usually carried out in a gas phase comprising monomers and comonomers and additionally also often other gaseous components such as polymerization diluents, for example nitrogen or alkanes, or hydrogen as molecular weight modifier or low-molecular weight reaction products. The obtained products are generally solid polyolefin particles which are formed by polymerization catalyst systems usually comprising particulate catalyst solids.

When the produced material is continuously or discontinuously removed from the gas-phase polymerization reactors, the discharged product is not only pure polyolefin but contains also portions of the gaseous phase as intergranular gas or as dissolved hydrocarbons. For ecological, safety and quality reasons, these entrained parts of the gas-phase have to be removed from the polyolefin particles because its components constitute an impact on the environment, gaseous hydrocarbons may result in the formation of explosive mixtures in downstream equipment and remaining non-polymerized components in the final polyolefin polymers may cause problems of quality such as odor formation. Furthermore, it is desirable to recycle unreacted monomer and comonomer to the polymerization process.

A common practice for removing the entrained parts of the gas-phase from the polyolefin particles is contacting the particles with a stream of an inert gas, usually in countercurrent flow. Such a step is frequently denoted as "degassing" or "purging". Often such a degassing or purging step is combined with a step of deactivating the polymerization catalyst and/or cocatalysts, e.g. by reacting the catalyst and/or cocatalysts with water.

For examples, EP 339 122 A1 discloses a two-step method for removing unpolymerized gaseous monomers from a solid olefin polymer while deactivating Ziegler-Natta catalysts and organometallic catalyst residues present in said solid olefin polymer, which is carried out in a single vessel. The solid olefin polymer is first countercurrently contacted with a first purge gas, preferably pure nitrogen, in an upper zone of the purge vessel, then transferred in the lower zone of the purge vessel and there countercurrently contacted with a second purge gas containing water, preferably pure nitrogen and steam.

U.S. Pat. No. 5,071,950 refers to a process for the continuous preparation of an ethylene/α-olefin copolymer in which the resulting ethylene copolymers are transferred to a let-down zone of reduced pressure and then the solid copolymer is freed of residual monomers and odor and flavor substances in a two-step way by first flushing with gaseous ethylene and then flushing with a mixture of nitrogen and steam. Similarly, EP 683 176 A1 describes a process for continuously manufacturing ethylene (co-)polymer in a gaseous phase in which the solid (co)polymer, after having passed a depressurization zone, is subjected to (1) a non-deactivating flushing with respect to the active catalytic residues, and subsequently (2) a deactivating flushing with a gaseous mixture of nitrogen, water and oxygen. Preferably, the gas for the non-deactivating flushing is the gaseous reaction mixture which circulates in the polymerization zone.

WO 2006/082007 A1 discloses an ethylene polymerization process in a gas-phase reactor in which the obtained polymer particles are discharged from the reactor, separated from the major part of the concomitantly discharged reactor gas and thereafter degassed, wherein the degassing is carried out with a propane fraction separated from the concomitantly discharged reactor gas.

WO 2008/015228 A2 describes a process to perform the finishing of polyolefins produced by gas-phase catalytic polymerization of one or more α-olefins in the presence of a polymerization diluent selected from a $C_3$-$C_5$ alkane, in which the polyolefin particles discharged from the gas-phase reactor are subjected to a first degassing step in which the polyolefin particles are countercurrently contacted with a gaseous stream containing at least 85 mol-% of a $C_3$-$C_5$ alkane and then to a second degassing step in which the polyolefin particles are countercurrently contacted with steam. Since the steam partly condensates on contact with the polyolefin particles, the process requires a subsequent drying step.

These processes provide possibilities for a sufficient degassing of polyolefin polymers prepared in gas-phase polymerization. However, they require significant efforts to ensure that a desired low level of residues is reached, as well in operating expenses as in investment costs, especially if the polymerization is carried out with a $C_3$-$C_5$ alkane as polymerization diluent.

Thus, it was the object of the present invention to overcome the disadvantages of the prior art and to find a possibility for degassing polyolefin particles obtained by gas-phase polymerization in the presence of $C_3$-$C_5$ alkane as polymerization diluent, which can be carried out cost-efficiently as well with respect to operating expenses as to investment costs, which allows to recycle almost all monomer and comonomer concurrently discharged with the polyolefin particles and which provides polyolefin products with a sufficiently low level of volatile components.

SUMMARY OF THE INVENTION

We found that this object is achieved by a process for treating polyolefin particles obtained by gas-phase polymerization of one or more olefins in the presence of a polymerization catalyst system and a $C_3$-$C_5$ alkane as polymerization diluent in a gas-phase polymerization reactor, the process comprising the steps of a) discharging the polyolefin particles continuously or discontinuously from the gas-phase polymerization reactor and transferring the particles to a first degassing vessel;
b) contacting therein the polyolefin particles with a gaseous stream comprising at least 85 mol.-% of $C_3$-$C_5$ alkane while the polyolefin particles have an average residence time in the first degassing vessel of from 5 minutes to 5 hours, wherein the contacting is carried out at conditions under which no condensation of water occurs;
c) transferring the polyolefin particles to a second degassing vessel;
d) contacting therein the polyolefin particles with a stream comprising nitrogen and steam while the polyolefin particles have an average residence time in the second degassing vessel of from 5 minutes to 2 hours;
e) transferring the polyolefin particles to a third degassing vessel;
f) contacting therein the polyolefin particles with a stream of nitrogen while the polyolefin particles have an average residence time in the third degassing vessel of from 5 minutes to 8 hours.

Furthermore, we have found processes for preparing polyolefin polymers by gas-phase polymerization of one or more olefins in the presence of a polymerization catalyst system and a $C_3$-$C_5$ alkane as polymerization diluent in a gas-phase polymerization reactor, wherein the obtained polyolefin particles are subjected to such a treating process.

BRIEF DESCRIPTION OF THE DRAWINGS

The features and advantages of the present invention can be better understood via the following description and the accompanying drawing which shows schematically a preferred polymerization system for treating the obtained polyolefin particles according to the process of the present invention.

FIG. 1 shows schematically a polymerization system for treating the obtained polyolefin particles according to the process of the present invention.

DETAILED DESCRIPTION OF THE INVENTION

The present invention provides a process for treating polyolefin particles obtained by gas-phase polymerization of one or more olefins in the presence of a polymerization catalyst system. Suitable olefins for such a polymerization are especially 1-olefins, i.e. hydrocarbons having terminal double bonds, without being restricted thereto. Suitable olefins monomers can however also be functionalized olefinically unsaturated compounds. Preference is given to linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene or conjugated and nonconjugated dienes such as 1,3-butadiene, 1,4-hexadiene or 1,7-octadiene. Suitable olefins also include ones in which the double bond is part of a cyclic structure which can have one or more ring systems. Examples are cyclopentene, norbornene, tetracyclododecene or methyl-norbornene or dienes such as 5-ethylidene-2-norbornene, norbornadiene or ethylnorbornadiene. It is also possible to polymerize mixtures of two or more olefins.

The process is in particular suitable in the gas-phase homopolymerization or copolymerization of ethylene or propylene and is especially preferred for the homopolymerization or copolymerization of ethylene. Preferred comonomers in propylene polymerization are up to 40 wt.-% of ethylene and/or 1-butene, preferably from 0.5 wt.-% to 35 wt.-% of ethylene and/or 1-butene. As comonomers in ethylene polymerization, preference is given to using up to 20 wt.-%, more preferably from 0.01 wt.-% to 15 wt.-% and especially from 0.05 wt.-% to 12 wt.-% of $C_3$-$C_8$-1-alkenes, in particular 1-butene, 1-pentene, 1-hexene and/or 1-octene. Particular preference is given to a process in which ethylene is copolymerized with from 0.1 wt.-% to 12 wt.-% of 1-hexene and/or 1-butene.

The polymerization of olefins can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are of the Ziegler type preferably comprising a compound of titanium or vanadium, a compound of magnesium and optionally an electron donor compound and/or a particulate inorganic oxide as support. Such Ziegler type catalysts are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

The obtained polyolefin particles have a more or less regular morphology and size, depending on the catalyst morphology and size, and on polymerization conditions. Depending on the catalyst used, the polyolefin particles usually have a mean diameter of from a few hundred to a few thousand micrometers. In the case of chromium catalysts, the mean particle diameter is usually from about 300 to about 1600 µm, and in the case of Ziegler type catalysts the mean particle diameter is usually from about 500 to about 3000 µm.

The process for obtaining the polyolefin polymers is a gas-phase polymerization, i.e. a process in which the solid polymers are obtained from a gas-phase comprising the monomer or the monomers. Such polymerizations are usually carried out at pressures of from 0.1 to 10 MPa, preferably from 0.5 to 8 MPa and in particular from 1.0 to 3 MPa. The polymerization temperature is customarily from 30 to 160° C. and preferably from 65 to 125° C.

Suitable reactors are, for example, stirred gas-phase reactors, multizone gas-phase reactors, or gas-phase fluidized-bed reactors. Reactors of these types are generally known to those skilled in the art. Stirred gas-phase reactors can for example be horizontally or vertically stirred.

Preferred reactors are fluidized-bed reactors, i.e. reactors comprising a bed of polymerizing polymer particles which are kept in fluidized state by introducing a gas from below. This gas is then usually taken off at the upper end of the reactor, cooled to remove the heat of polymerization and recirculated back into the reactor at its lower end. In the process of the present invention, the circulated reaction gas is usually a mixture of the olefins to be polymerized, a $C_3$-$C_5$ alkane as polymerization diluent and optionally other inert gases like nitrogen or further alkanes and/or a molecular weight regulator such as hydrogen. The polymerization can also be carried out in a condensing or super-condensing mode, in which part of the circulating gas is cooled to below the dew point and returned to the reactor separately as a liquid and a gas phase or together as a two-phase mixture in order to make additional use of the enthalpy of vaporization for cooling the reaction gas.

Preferred reactors are further multizone circulating reactors which are, for example, described in WO 97/04015 and WO 00/02929 and have two interconnected polymerization zones, a riser, in which the growing polymer particles flow upward under fast fluidization or transport conditions and a downcomer, in which the growing polymer particles flow in a densified form under the action of gravity. The polymer particles leaving the riser enter the downcomer and the polymer particles leaving the downcomer are reintroduced into the riser, thus establishing a circulation of polymer between the two polymerization zones and the polymer is passed alternately a plurality of times through these two zones. It is further also possible to operate the two polymerization zones of one multizone circulating reactor with different polymerization conditions by establishing different polymerization conditions in its riser and its downcomer. For this purpose, the gas mixture leaving the riser and entraining the polymer particles can be partially or totally prevented from entering the downcomer. This can for example be achieved by feeding a barrier fluid in form of a gas and/or a liquid mixture into the downcomer, preferably in the upper part of the downcomer. The barrier fluid should have a suitable composition, different from that of the gas mixture present in the riser. The amount of added barrier fluid can be adjusted in a way that an upward flow of gas countercurrent to the flow of the polymer particles is generated, particularly at the top thereof, acting as a barrier to the gas mixture entrained among the particles coming from the riser. In this manner it is possible to obtain two different gas composition zones in one multizone circulating reactor. Furthermore it is also possible to introduce make-up monomers, comonomers, molecular weight regulator such as hydrogen and/or inert fluids at any point of the downcomer, preferably below the barrier feeding point. Thus, it is also easily possible to create varying monomer, comonomer and hydrogen concentrations along the downcomer resulting in a further differentiation of the polymerization conditions.

The process of the present invention is carried out in the presence of a $C_3$-$C_5$ alkane as polymerization diluent and preferably in the presence of propane, especially in the case of homopolymerization or copolymerization of ethylene.

According to the present invention, as step a) of the treating process, the polyolefin particles obtained by the gas-phase polymerization are discharged from the gas-phase polymerization reactor and transferred to a first degassing vessel. The discharge from the reactor can be carried out pneumatically or with the aid of mechanical discharge systems, with pneumatic discharge being preferred. In the simplest and particularly preferred case, the discharge is achieved by means of the pressure gradient prevailing between the polymerization reactor and the first downstream vessel. Preferably the polyolefin particles are discharged continuously from the gas-phase polymerization reactor.

The separation of the polyolefin particles discharged from the reactor from the major part of the concomitantly discharged reaction gas can be carried out together with or separately from the first degassing step of the polyolefin particles, either in terms of time or in terms of space. That means, in a preferred embodiment the separation of the solid polyolefin particles from the major part of the reaction gas is carried out in a separation vessel, which is usually operated at a pressure between the pressure in the polymerization reactor and the pressure in the first degassing vessel and preferably operated at a pressure of from 0.5 MPa to 3 MPa, more preferably of from 1 MPa to 2 MPa, and the polyolefin particles are thereafter transferred to the first degassing vessel for carrying out step b) of the treating process, i.e. contacting the solid polyolefin particles with the gaseous stream comprising at least 85 mol-% of $C_3$-$C_5$ alkane. As an alternative, in the case of discontinuous discharge, it is also possible that the polyolefin particles are directly discharged into the first degassing vessel, the major part of the reaction gas is then separated off from the polyolefin particles and thereafter the particles are contacted with the gaseous stream comprising at least 85 mol-% of $C_3$-$C_5$ alkane in the same vessel. In a further preferred embodiment of the present invention, the polyolefin particles are directly discharged into the first degassing vessel in which the polyolefin particles are simultaneously separated from the major part of the concomitantly discharged reaction gas and contacted with the gaseous stream comprising at least 85 mol-% of $C_3$-$C_5$ alkane. It is further possible to carry out the first degassing step b) in a parallel arrangement in two or more first degassing vessels.

The contacting of the polyolefin particles coming from the gas-phase polymerization reactor and the gaseous stream comprising at least 85 mol-% of $C_3$-$C_5$ alkane is preferably carried out countercurrently. The polyolefin particles are then preferably introduced in the upper portion of the first degassing vessel and move downwards by gravity in contact with a countercurrent flow of a gaseous stream introduced at the bottom of the degassing vessel. This gaseous stream comprises at least 85 mol-%, preferably more than 95 mol-% of $C_3$-$C_5$ alkane, i.e. of propane, butane or pentane or a mixtures thereof or of their isomers. Preferably the $C_3$-$C_5$ alkane is the same $C_3$-$C_5$ alkane which is used as polymerization diluent in the gas-phase polymerization reactor. It is especially preferred that the $C_3$-$C_5$ alkane is propane. Preferably the gaseous stream comprising at least 85 mol-% of $C_3$-$C_5$ alkane is fed to the degassing vessel in an amount of from 10 kg to 200 kg per 1000 kg of polyolefin particles to be treated.

Subsequent to contacting the gaseous stream comprising at least 85 mol-% of $C_3$-$C_5$ alkane with the polyolefin particles, a gas mixture enriched in unreacted monomers, comonomers, oligomers and other hydrocarbons is withdrawn from the first degassing vessel, preferably from its top. This gas mixture is then preferably conveyed to an alkane and monomer recovery unit, in which the gas mixture is separated in fractions which can easily be recycled in purified form to the polymerization process. Preferably the material for forming the gaseous stream in step b) of the treating process of the present invention comes directly from this alkane and monomer recovery unit. Methods and apparatuses for separating and purifying such gas mixture are well known in the art and are, for example, described in WO 2006/082007 A1. The conveying of the gas mixture withdrawn from the first degassing vessel to the alkane and monomer recovery unit is preferably carried out by means of a compressor. In the course of this conveying step it is further possible to pass the gas mixture through a heat exchanger.

Preferably step b) of the process for treating polyolefin particles is carried out at a pressure of from 0.1 MPa to 0.4 MPa, more preferably of 0.12 MPa to 0.35 MPa and in particular of from 0.15 MPa to 0.3 MPa and a temperature of from 50° C. to 120° C., more preferably of from 60° C. to 100° C. and in particular of from 70° C. to 90° C. The average residence time of the polyolefin particles in the first degassing vessel is from 5 minutes to 5 hours, preferably from 10 minutes to 4 hours and in particular from 15 minutes to 2 hours.

After step b) of the treatment process, the residual loading of the polyolefin particles polymer with hydrocarbons of four or more carbon atoms such as 1-butene, 1-hexene or hexane should be low so as to keep the loss of hydrocarbons as low as possible. Preference is given to a residual loading of equal to or less than 2500 ppm by weight, particularly preferably equal to or less than 1000 ppm by weight.

After having been treated in the first degassing vessel, the polyolefin particles are transferred in step c) of the process of the present invention to a second degassing vessel, in which, as step d), the polyolefin particles are contacted with a stream comprising nitrogen and steam. The transfer is preferably effected by means of gravity and a pressure gradient between the first and the second degassing vessel.

In the second degassing vessel, the contacting of the polyolefin particles and the stream comprising nitrogen and steam is preferably carried out countercurrently. In such a case, the polyolefin particles are preferably introduced at the top of the second degassing vessel and move downwards by gravity in contact with a countercurrent flow of the stream comprising nitrogen and steam introduced at the bottom of the degassing vessel.

The stream for degassing the polyolefin particles in the second degassing vessel comprises steam in an amount that no condensation of water occurs at the conditions within the second degassing vessel. The stream comprises preferably from 2 mol-% to 20 mol-%, more preferably from 5 mol-% to 15 mol-% of water vapor. The steam is preferably added in form of superheated or saturated steam and in particular in form of slightly superheated steam. In a preferred embodiment of the present invention, the nitrogen for forming the stream comprising nitrogen and steam is at least partly not fresh nitrogen but nitrogen coming from the third degassing step, in which it had previously been contacted with polyolefin particles having been transferred from the second to the third degassing vessel. Preferably the stream comprising nitrogen and steam is fed to the second degassing vessel in an amount of from 10 kg to 150 kg per 1000 kg of polyolefin particles to be treated and in particular in an amount of from 20 kg to 80 kg per 1000 kg of polyolefin particles to be treated.

Subsequent to contacting the stream comprising nitrogen and steam with the polyolefin particles, a gas mixture enriched in unreacted comonomers, oligomers, other hydrocarbons and comprising reaction products of the reaction of the water vapor with the components of the polymerization catalyst system is withdrawn from the second degassing vessel, preferably from its top. In a preferred embodiment of the present invention, this gas mixture is taken off the polymerization system as off-gas and, after having passed a simple neutralization unit, disposed, for example via a catalytical oxidation unit.

It is possible to carry out the process of the present invention using only a relatively small amount of steam in the second degassing vessel since the water vapor has mainly the function of deactivating the catalyst components, in particular the organoaluminum compounds of the polymerization catalyst system.

Preferably step d) of the process for treating polyolefin particles is carried out at a pressure of from 0.1 MPa to 0.35 MPa, more preferably of 0.11 MPa to 0.25 MPa and a temperature of from 50° C. to 120° C., more preferably of from 60° C. to 100° C. and in particular of from 70° C. to 90° C. The average residence time of the polyolefin particles in the second degassing vessel is from 5 minutes to 2 hours and preferably from 10 minutes to 1 hour.

After step d) of the treatment process, the residual loading of the polyolefin particles polymer with hydrocarbons of four or more carbon atoms such as 1-butene, 1-hexene or hexane should be preferably not more than 1000 ppm by weight and particularly preferably not more than 400 ppm by weight.

After having been treated in the second degassing vessel, the polyolefin particles are transferred in step e) of the process of the present invention to a third degassing vessel, in which, as step f), the polyolefin particles are contacted with a stream of nitrogen. The transfer is preferably effected by means of a stream of nitrogen which had previously been used for contacting the polyolefin particles in step f), i.e. which had been withdrawn from the third degassing vessel and is reused as conveying medium for the particle transfer from the second to the third degassing vessel. It is further possible to carry out the third degassing step f) in a parallel arrangement in two or more third degassing vessels.

In the third degassing vessel, the contacting of the polyolefin particles and the stream of nitrogen is preferably carried out countercurrently. In such a case, the polyolefin particles are preferably introduced at the top of the second degassing vessel and move downwards by gravity in contact with a countercurrent flow of a nitrogen stream introduced at the bottom of the degassing vessel.

Subsequent to contacting the nitrogen stream with the polyolefin particles, a gas mixture enriched in unreacted comonomers, oligomers and other hydrocarbons is withdrawn from the third degassing vessel, preferably from its top. This gas mixture is then preferably cooled in a heat exchanger, compressed and then reused for both forming a part of the gaseous stream for degassing in the second degassing vessel and, after being cooled in a further heat exchanger, for transporting the polyolefin particles from the second degassing vessel to the third degassing vessel.

Preferably step f) of the process for treating polyolefin particles is carried out at a pressure of from 0.1 MPa to 0.2 MPa, more preferably of 0.1 MPa to 0.15 MPa and a temperature of from 50° C. to 120° C., more preferably of from 60° C. to 100° C. and in particular of from 70° C. to 90° C. The average residence time of the polyolefin particles in the third degassing vessel is from 5 minutes to 10 hours, preferably from 10 minutes to 6 hours and in particular from 20 minutes to 4 hours.

After step f) of the treatment process, the residual loading of the polyolefin particles polymer with hydrocarbons of four or more carbon atoms such as 1-butene, 1-hexene or hexane should be preferably not more than 50 ppm by weight.

After having been treated in the third degassing vessel, the polyolefin particles are transferred to the further work-up such as for example being provided with polymer additives and/or being pelletized in an extrusion step.

In a preferred embodiment of the present invention the third degassing vessel is only partly filled with polyolefin particles and the empty volume within the third degassing vessel is sufficient to take up additional polyolefin particles for at least 3 hours and preferably for at least 4 hours in case the transfer of polyolefin particles from the third degassing vessel to the further work-up is discontinued and the transfer of the polyolefin particles of step e) from the second to the third degassing vessel continues with unchanged rate. If the third degassing vessel is operated in this manner, it functions not only as housing for the treatment of step f) but also as buffer for situations in which the downstream work-up of the polyolefin particles is interrupted for a limited period of time such as for example if the extruder is stopped for a change of blades. It is then possible to continue with polymerizing at unchanged rate and store the produced polyolefin particles temporarily in the third degassing vessel until the downstream work-up is restarted. If the polymerization system is constructed in a way that the third degassing vessel is accordingly operated as buffer vessel it can be avoided to install other buffer units downstream of the third degassing vessel and upstream of the melt mixing device such as an extruder.

FIG. 1 shows schematically a polymerization system for treating the obtained polyolefin particles according to the process of the present invention.

Gas-phase polymerization reactor (1) is a fluidized-bed reactor comprising a fluidized bed (2) of polyolefin particles, a gas distribution grid (3) and a velocity reduction zone (4). The velocity reduction zone (4) is generally of increased diameter compared to the diameter of the fluidized-bed portion of the reactor. The polyolefin bed is kept in a fluidization state by an upwardly flow of gas fed through the gas distribution grid (3) placed at the bottom portion of the reactor (1). The gaseous stream of the reaction gas leaving the top of the velocity reduction zone (4) via recycle line (5) is compressed by compressor (6), transferred to a heat exchanger (7), in which it is cooled, and then recycled to the bottom of the fluidized-bed reactor (1) at a point below the gas distribution grid (3) at position (8). The recycle gas can, if appropriate, be cooled to below the dew point of one or more of the recycle gas components in the heat exchanger so as to operate the reactor with condensed material, i.e. in the condensing mode. The recycle gas comprises, besides unreacted monomers, a $C_3$-$C_5$ alkane as polymerization diluent. Make-up monomers, molecular weight regulators, and process additives can be fed into the reactor (1) at various positions, for example via line (9) upstream of the compressor (6); this non-limiting the scope of the invention. Generally, the catalyst is fed into the reactor (1) via a line (10) that is preferably placed in the lower part of the fluidized bed (2).

The polyolefin particles obtained in fluidized-bed reactor (1) are discharged via line (11) and fed to a degassing vessel (12), in which the polyolefin particles are contacted with a gaseous stream of propane. However, it is also possible not to directly discharge the polyolefin particles into degassing vessel (12) but first discharge the polyolefin particles into a separation vessel (not shown), separate therein the polyolefin particles from the major part of the concomitantly discharged reaction gas and transfer the particles thereafter from the separation vessel to degassing vessel (12). Propane is fed to degassing vessel (12) at its bottom at position (13) and flows in it upwards countercurrently to the flow of the polyolefin particles. The gas leaving the degassing vessel (12) via line (14) comprises beside propane, which had been fed at position (13), reaction gas, which had been discharged from fluidized-bed reactor (1) concomitantly with the polyolefin particles, and gaseous components, which come out from the polyolefin particles. The gas stream leaving the degassing vessel (12) via line (14) is cooled in a heat exchanger (15) and transferred by compressor (16) to the propane and monomer recovery unit (17), from which purified monomers and purified propane are recycled to the fluidized-bed reactor (1) via one or more lines (18). Furthermore, purified propane is fed via line (19) from the propane and monomer recovery unit (17) to the degassing vessel (12) for carrying out the first degassing step.

At the bottom of degassing vessel (12), polyolefin particles are withdrawn and transferred to a second degassing vessel (20) by means of gravity. The polyolefin particles are contacted with a stream of nitrogen and steam which is fed to the degassing vessel (20) at its bottom at position (21) and flows in it upwards countercurrently to the flow of the polyolefin particles. The conditions in the degassing vessel (20) are selected in a way that no condensation of water occurs.

The gas leaving degassing vessel (20) via line (22) exits the polymerization system as off-gas. The gas mixture for treating the polyolefin particles in the second degassing step is composed of steam fed via line (23) and nitrogen, which can be added as fresh nitrogen via line (24) or as reused nitrogen coming from the subsequent third degassing step via line (25). Preferably at least the major part of the nitrogen fed to the degassing vessel (20) at position (21) is reused nitrogen coming via line (25).

At the bottom of degassing vessel (20), polyolefin particles are withdrawn and transferred to a third degassing vessel (26) by means of reused nitrogen coming via line (27). In the third degassing vessel (26), the polyolefin particles are countercurrently contacted with a stream of nitrogen, which is fed as fresh nitrogen via line (28) at position (29). The gas leaving the third degassing vessel (26) via line (30) is cooled in a heat exchanger (31), compressed by compressor (32) and fed to both line (25) for being further used as part of the gas stream in the second degassing vessel (20) and to heat exchanger (33) for being cooled and then used via line (27) for transporting polyolefin particles from degassing vessel (20) to degassing vessel (26).

At the bottom of degassing vessel (26), polyolefin particles are withdrawn and transferred via line (34) to the further work-up such as being provided with polymer additives and pelletized in an extrusion step.

The present invention further refers to a process for preparing a polyolefin polymer, preferably a homopolymer or copolymer of ethylene, by gas-phase polymerization of one or more olefins in the presence of a polymerization catalyst system and a $C_3$-$C_5$ alkane as polymerization diluent in a gas-phase polymerization reactor, wherein the obtained polyolefin particles are treated as described above.

An advantage of the process of the present invention is that the degassing vessel, in which the deactivation of the polymerization catalyst system is carried out, is of a relatively small size. Since the deactivation of the polymerization catalyst system results in corrosive by-products and the materials in contact with these by-products need to be corrosion resistant, only one vessel of relatively small size has to be designed in this way. Thus, the investment costs for an apparatus for carrying out the polyolefin particle treatment according to the present invention are reduced compared to those of apparatuses according to the prior art.

Moreover, the process of the present invention provides a degassing of the polyolefin particles, in which almost all monomers and comonomers concurrently discharged with the polyolefin particles are recycled to the polymerization and the obtained polyolefin products have a good organoleptic and odor formation is avoided, in a cost-efficient manner with low operating expenses and relatively small amounts of freshly fed purging materials.

EXAMPLES

The density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

The melt flow rate $MFR_{2.16}$ was determined according to DIN EN ISO 1133:2005, condition Data temperature of 190° C. under a load of 2.16 kg.

The measurement of the content of volatile organic compounds in the manufactured ethylene copolymers was carried out according to the "static head-space" extraction method. This method consists in heating a sample of 4 g of ethylene copolymer in an oven to a temperature of 130° C. for 60 minutes. Part of the gaseous phase released from the sample of polymer is then injected into a gas chromatography apparatus GC-MS Agilent 6890-5973N to detect the different organic compounds.

Example 1

Polymerization Conditions

The preparation of a linear low density polyethylene (LLDPE) using 1-hexene as the comonomer was carried out in a fluidized bed reactor as shown in FIG. 1.

As the polymerization catalyst, a Ziegler-Natta catalyst was used, comprising:
- a titanium solid catalyst component prepared with the procedure described in WO 2004/106388 A2, Example 1, according to which ethylacetate is used as an internal donor compound;
- a mixture of triisobutylaluminum (TIBAL) and diethyl aluminum chloride (DEAC) in a weight ratio of 7:1, used as the cocatalyst; and
- tetrahydrofuran as an external donor.

The above solid catalyst component was fed to a catalyst activation system, together with the cocatalyst and the external donor, the weight ratio cocatalyst/solid component was 10, the weight ratio cocatalyst/external donor was 7. The above catalyst components were pre-contacted in propane at a temperature of 50° C. for 60 minutes.

After leaving the activation system, the activated catalyst was fed to fluidized bed reactor (1) for copolymerizing ethylene with 1-hexene in the presence of propane as a polymerization diluent. Hydrogen was used as molecular weight regulator. The ethylene 1-hexene polymerization was carried out at a temperature of 85° C. and a pressure of 2.5 MPa. The composition of the gaseous reaction mixture was: 30 mol-% of ethylene, 5 mol-% of 1-hexene, 5 mol-% of hydrogen and 60 mol-% of propane.

The obtained LLDPE copolymer had a density of 0.919 g/cm³, a $MFR_{2.16}$ of 1.0 g/10 min. The average diameter of the polymer particles was about 1200 μm.

First Degassing Step 50 kg/h of LLDPE particles were continuously discharged from fluidized bed reactor (1) and transferred to the top of the first degassing vessel (12).

A gaseous stream containing 99 mol-% of propane and 1 mol-% of ethylene was continuously introduced at the bottom of said degassing vessel. The LLDPE particles moved downwards by gravity along the degassing vessel and were countercurrently contacted with the gaseous stream containing 99 mol-% of propane.

Propane enriched in oligomers and heavy hydrocarbons was obtained at the top of the first degassing vessel. The gaseous mixture containing propane, oligomers and heavy hydrocarbons was transferred to the propane and monomer recovery unit (17) to obtain the above-mentioned stream containing 99 mol-% of propane, which was continuously introduced at the bottom of the first degassing vessel (12).

The first degassing vessel (12) was operated at a temperature of 75° C. and a pressure of 0.25 MPa. The average residence time of the LLDPE particles in the first degassing vessel was about one hour.

The first degassing step achieved a first substantial removal of the 1-hexene and almost all the hydrocarbons with more than 4 carbon atoms adsorbed on the polymer particles. The LLDPE particles were subsequently withdrawn from the first degassing vessel (12) and conveyed to the second degassing vessel (20).

Second Degassing Step

The LLDPE particles withdrawn from the first degassing vessel (12) were introduced into the second degassing vessel (20) at the top, wherein the LLDPE particles moved downwards by gravity along the degassing vessel, thus being countercurrently contacted with a gaseous stream containing nitrogen and steam which was introduced at the bottom of the second degassing vessel (20).

The total rate of nitrogen fed to the second degassing vessel (20) was to 2 kg/h, corresponding to 40 kg of nitrogen per 1000 kg of polyolefin particles to be treated and the amount of steam fed was to 0.1 kg/h. The second degassing vessel was operated at a temperature of 70° C. with a residence time of the polymer powder of 20 minutes. A nitrogen/steam stream enriched in propane, oligomers and heavy organic compounds was discharged from the top of the second degassing vessel (20). The LLDPE particles were subsequently withdrawn from the second degassing vessel (20) and conveyed to the third degassing vessel (26).

Third Degassing Step

After the discharge from the second degassing vessel (20), the LLDPE particles were further purged by means of a flow of nitrogen in a third degassing vessel (26) with also functioned as storage buffer silo. Inside the third degassing vessel (26) the LLDPE particles moved downwards by gravity and were countercurrently contacted with a nitrogen stream. The operating temperature of the third degassing vessel (26) was 70° C. and the operating level was kept at 25% of the maximum allowable level. From the top of the third degassing vessel (26) a stream of nitrogen containing residual hydrocarbons was obtained, which was subjected to compression in compressor (32) and reused partly for transporting the LLDPE particles from the second degassing vessel (20) to the third degassing vessel (26) and partly as nitrogen fed together with fresh nitrogen and steam to the second degassing vessel (20).

A sample of the LLDPE particles discharged from the third degassing vessel (26) was subjected to the measurement of the content of volatile organic compounds. The following results were obtained (in parts per million (ppm) by weight per gram of polymer):

$C_6$-hydrocarbons (saturated and non-saturated; branched and linear): 10 ppm
iso-$C_8$ hydrocarbons: 5 ppm
normal $C_8$ hydrocarbons: 0 ppm
n-$C_{10}$ hydrocarbons: 8 ppm
n-$C_{12}$ hydrocarbons: 15 ppm
n-$C_{14}$ hydrocarbons: 9 ppm
n-$C_{16}$ hydrocarbons: 3 ppm The data prove that the process for treating polyolefin particles according to the present invention allows to reduce the total concentration by weight of oligomers and hydrocarbons higher than $C_5$ (i.e. with more than 5 carbon atoms) in the treated polyolefin particles to a value of less than 50 ppm by weight; as a consequence, the obtained LLDPE polymer can be suitably employed for manufacturing plastic items for food and pharmaceutical applications, without incurring in unpleasant development of bad odor.

What is claimed is:

1. A process for treating polyolefin particles produced by a gas-phase polymerization of one or more olefins in the presence of a polymerization catalyst system and a $C_3$-$C_5$ alkane as a polymerization diluent in a gas-phase polymerization reactor comprising:
   a) discharging the polyolefin particles continuously or discontinuously from the gas-phase polymerization reactor and transferring the particles to a first degassing vessel;
   b) contacting therein the polyolefin particles with a gaseous stream comprising at least 85 mol-% of $C_3$-$C_5$ alkane while the polyolefin particles have an average residence time in the first degassing vessel of from 5 minutes to 5 hours;
   c) transferring the polyolefin particles to a second degassing vessel;
   d) contacting therein the polyolefin particles with a stream comprising nitrogen and steam while the polyolefin particles have an average residence time in the second degassing vessel of from 5 minutes to 2 hours, wherein the contacting is carried out using a stream comprising 2-20% by mol water vapor at conditions under which no condensation of water occurs;
   e) transferring the polyolefin particles to a third degassing vessel;
   f) contacting therein the polyolefin particles with a stream of nitrogen while the polyolefin particles have an average residence time in the third degassing vessel of from 5 minutes to 8 hours.

2. The process for treating polyolefin particles according to claim 1, wherein, in step a), the polyolefin particles are discharged into a separation vessel in which they are separated from the major part of the concomitantly discharged reaction gas and then transferred from the separation vessel to the first degassing vessel.

3. The process for treating polyolefin particles according to claim 1, wherein, in step a), the polyolefin particles are directly discharged into the first degassing vessel.

4. The process for treating polyolefin particles according to claim 1, wherein the contacting of the polyolefin particles in steps b), d) and f) is carried out countercurrently.

5. The process for treating polyolefin particles according to claim 1, wherein at least a part of the nitrogen for contacting the polyolefin particles in steps d) had previously been used for contacting the polyolefin particles in steps f).

6. The process for treating polyolefin particles according to claim 1, wherein step e) is at least partly carried out by nitrogen which had previously been used for contacting the polyolefin particles in steps f).

7. The process for treating polyolefin particles according to claim 1, wherein step b) is carried out at a pressure of from 0.1 MPa to 0.4 MPa and a temperature of from 50° C. to 120° C.

8. The process for treating polyolefin particles according to claim 1, wherein step d) is carried out at a pressure of from 0.1 MPa to 0.35 MPa and a temperature of from 50° C. to 120° C.

9. The process for treating polyolefin particles according to claim 1, wherein step f) is carried out at a pressure of from 0.1 MPa to 0.2 MPa and a temperature of from 50° C. to 120° C.

10. The process for preparing a polyolefin polymer according to claim 1, wherein the polyolefin polymer is a homopolymer or copolymer of ethylene.

\* \* \* \* \*

UNITED STATES PATENT AND TRADEMARK OFFICE
CERTIFICATE OF CORRECTION

PATENT NO. : 9,458,259 B2  
APPLICATION NO. : 14/650532  
DATED : October 4, 2016  
INVENTOR(S) : Giuseppe Penzo et al.

Page 1 of 1

It is certified that error appears in the above-identified patent and that said Letters Patent is hereby corrected as shown below:

On the Title Page

| | | |
|---|---|---|
| Column 1, (30) | Line 1 | Delete "12196451" and insert --12196451.4-- |
| Column 2, (57) | Line 5 | After "of", insert --:-- |

In the Specification

| | | |
|---|---|---|
| Column 2 | Line 67 | After "of", insert --:-- |
| Column 4 | Line 57 | Delete "30 to 160° C." and insert --30 °C. to 160 °C.-- |
| Column 4 | Line 58 | Delete "65 to 125° C." and insert --65 °C. to 125 °C.-- |

Signed and Sealed this  
Twenty-second Day of January, 2019

Andrei Iancu  
*Director of the United States Patent and Trademark Office*